(12) United States Patent
Chandhok et al.

(10) Patent No.: US 9,866,646 B2
(45) Date of Patent: Jan. 9, 2018

(54) SYSTEMS AND METHODS FOR ANTICIPATORY PUSH SEARCH FOR A HOMESCREEN BROWSER

(71) Applicant: Bento Labs Inc., San Francisco, CA (US)

(72) Inventors: Nikhil Chandhok, San Francisco, CA (US); Kunal Punera, San Francisco, CA (US); Kyle David Wilkinson, San Francisco, CA (US); Maxim Gurevich, Cupertino, CA (US); Nelson Lance Osacky, San Francisco, CA (US); Parth Shah, Mountain View, CA (US); Jeffrey Leon, San Francisco, CA (US)

(73) Assignee: Bento Labs Inc., San Francisco, CA (US)

( * ) Notice: Subject to any disclaimer, the term of this patent is extended or adjusted under 35 U.S.C. 154(b) by 195 days.

(21) Appl. No.: 14/820,855

(22) Filed: Aug. 7, 2015

(65) Prior Publication Data
US 2017/0041413 A1 Feb. 9, 2017

(51) Int. Cl.
*G06F 15/16* (2006.01)
*H04L 29/08* (2006.01)
*H04B 1/3827* (2015.01)

(52) U.S. Cl.
CPC .......... *H04L 67/26* (2013.01); *H04B 1/385* (2013.01); *H04L 67/2847* (2013.01); *H04L 67/306* (2013.01)

(58) Field of Classification Search
None
See application file for complete search history.

(56) References Cited

U.S. PATENT DOCUMENTS

| 8,176,437 | B1 | 5/2012 | Taubman |
| 9,094,469 | B1* | 7/2015 | Wilder ................. H04L 67/306 |
| 9,326,026 | B2* | 4/2016 | Ramakrishnan ..... H04N 21/454 |
| 9,514,229 | B2* | 12/2016 | Li ..................... G06F 17/30867 |

(Continued)

OTHER PUBLICATIONS

9 Cards Home Launcher—Android Apps on Google Play, 47 Degrees LLC—Jun. 4, 2014 <https://play.google.com/stores/apps/details?id=com.fortysevendeg.ninecardslauncher&hl=en> Downloaded Sep. 8, 2014, 4 pages.

(Continued)

*Primary Examiner* — Joshua Joo
(74) *Attorney, Agent, or Firm* — Blakely, Sokoloff, Taylor & Zafman LLP

(57) ABSTRACT

A method and apparatus for performing anticipatory push search for a homescreen browser of a mobile device is described. The method may include collecting profile data indicative of behavior of a user with respect to usage of a mobile device and constructing a user profile for an anticipated usage of the mobile device by the user. Furthermore, the method may include publishing a content search request based on the anticipated usage of the mobile device by the user, and receiving at least one content response from a content provider. The method may also include providing content from the content response to the mobile device based on the anticipated usage of the mobile device by the user, the content for populating an anticipatory homescreen browser displayed by the mobile device.

23 Claims, 10 Drawing Sheets

(56) References Cited

U.S. PATENT DOCUMENTS

| | | | | |
|---|---|---|---|---|
| 2014/0040243 | A1* | 2/2014 | Rubinstein | G06F 17/30554 707/722 |
| 2014/0086046 | A1* | 3/2014 | Reeves | H04L 47/127 370/229 |
| 2014/0089461 | A1* | 3/2014 | Harris | G06F 17/3087 709/217 |
| 2014/0095606 | A1* | 4/2014 | Matus | H04L 67/22 709/204 |
| 2014/0214878 | A1* | 7/2014 | Morse | G06Q 30/0267 707/758 |
| 2014/0280550 | A1* | 9/2014 | Glass | H04L 67/306 709/204 |
| 2014/0379462 | A1* | 12/2014 | Rangarajan | G06Q 30/0254 705/14.46 |
| 2015/0142560 | A1* | 5/2015 | Singh | G06Q 30/0267 705/14.53 |
| 2015/0379157 | A1* | 12/2015 | Brown | G06F 17/30902 709/213 |
| 2016/0013980 | A1* | 1/2016 | McKnight | H04L 41/0813 709/221 |
| 2016/0191650 | A1* | 6/2016 | Rong | H04L 67/306 709/213 |
| 2016/0241665 | A1* | 8/2016 | Covell | H04L 67/10 |
| 2016/0294956 | A1* | 10/2016 | Fix | H04L 43/0876 |

OTHER PUBLICATIONS

9 Cards Home Launcher—Android Apps on Google Play, 47 Degrees LLC—Jun. 4, 2014, "9 Cards follows your routine" <https://play.google.com/store/apps/details?id=com.fortysevendeg.ninecardslauncher&hl=en> Downloaded Sep. 8, 2014, 4 pages.

Google Now,—Wikipedia, the free encyclopedia, <http://en.wikipedia.org/wiki/Google_Now> Downloaded Sep. 8, 2014, 2 pages.

* cited by examiner

SYSTEMS AND METHODS FOR ANTICIPATORY PUSH SEARCH FOR A HOMESCREEN BROWSER

TECHNICAL FIELD

Embodiments of the invention relate to the field of search systems, and more particularly, to anticipatory push search for a mobile device.

BACKGROUND

Mobile devices are ubiquitous, reaching every facet of modern life from business, to school, to family, and so on. Users of such devices, including mobile telephones, tablet computers, wearable devices, etc., rely on their devices every day. To make a device suitable for the specific needs of a specific user, that user typically downloads mobile applications, or apps, to accomplish specific tasks. Discovery of which apps to try, download, and use is often accomplished through a process of trial and error, suggestion by friends, or searching an app store. The efforts may not result in the optimal application for the user's needs given the actual usage of the mobile device by the user.

Similarly, mobile devices are used to access information, find answers to questions, and performing services for a user. For example, a user may utilize a restaurant reservation application to search for nearby restaurants and make a reservation. To accomplish this exemplary task, as well as similar tasks, the user must choose which application to use among all applications on their mobile device, enter and search for information, and complete the transaction within the application. The same is required when a user searches, plays, and buys new music, reads news stories, purchases goods or services, etc. In each scenario, the user's attention is required to be directed to a single application and the task being performed.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
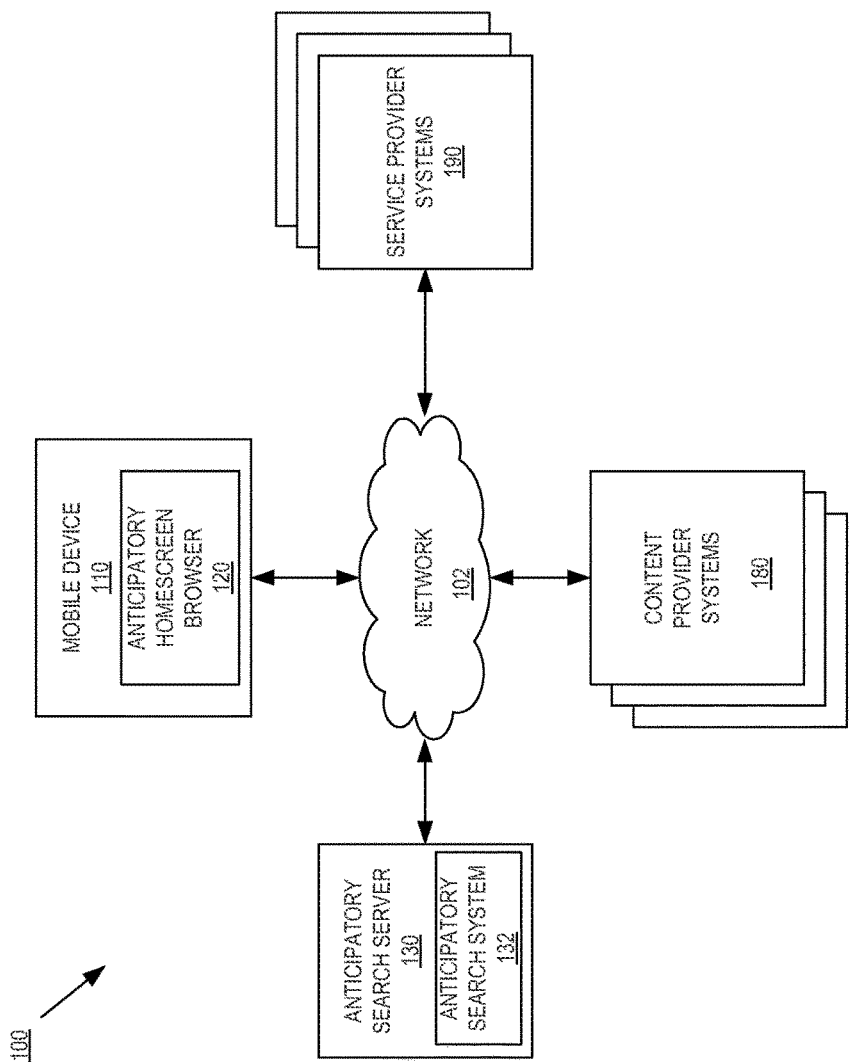
FIG. 1 is a block diagram illustrating an exemplary system architecture for providing anticipatory search services to a mobile device.

Methods and systems for performing anticipatory push search for a homescreen browser of a mobile device, such as a mobile telephone, tablet computer, wearable device, etc. is described. As discussed in greater detail below, anticipatory push search enables a homescreen browser running on a mobile device to display information, suggest applications relevant to a user, launch applications with relevant and/or anticipated user information, play selected music, as well as provide other content to the user. Furthermore, the content is provided automatically to the homescreen browser, without a user request.

In one embodiment, to provide a user with relevant information and/or launch relevant applications on a mobile device, an anticipatory search system collects user profile data associated with usage of the mobile device by the user. The user profile data can include applications frequently used, which applications a mobile device is currently running, topics of interest to a user, a user's musical preferences, a location of the mobile device, a location of the mobile device in relation to other profile data, etc. This profile data is utilized by the anticipatory search system to generate content search requests based on the anticipated usage of a mobile device by the user. For example, a user's profile may indicate that the user frequently searches restaurant reviews at 4 PM on Fridays. The anticipatory search system would utilize this information to generate searches for restaurant review content providers based on, for example, the user profile conditions (e.g., Friday and 4 PM), as well as other known conditions associated with the user (e.g., current location, deduced food preferences, history of restaurant reservations, etc.).

In one embodiment, content providers monitor the content search requests and determine which to respond to. That is, there are more content providers than just restaurant review services, as any number of different types of content providers can listen and responds to the various content search requests. The responses from the content providers are then analyzed by the anticipatory search system and selected for delivery to the homescreen browser of the mobile device. In one embodiment, the search results are ranked before selection based on the original query and/or the user's profile data. Furthermore, the ranking (but not necessarily the relevance) of search results can also be impacted by bids of the content providers that are associated with specific responses.

The homescreen browser receives the selected search results, which are pushed to the homescreen browser by the anticipatory search system without requiring a user request for the content. The search results are then displayed on the homescreen browser for consumption and use by the user of the mobile device. Because content queries are based on the user's profile data, which is constructed based on usage of the mobile device by the user, the content queries anticipate the likely needs and usage of the mobile device by the user.

The responses then automatically populate the homescreen browser, by displaying anticipated information, launching anticipated applications, making suggestions based on anticipated needs of the user, etc., that each reflect the anticipated usage of the mobile device is. Thus, the user is automatically provided with the information and applications that they need when the need it based on their actual device usage patterns.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "constructing", "publishing", "receiving", "providing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram illustrating an exemplary system architecture for providing anticipatory search services to a mobile device. In one embodiment, the system 100 includes mobile device 110, anticipatory search server 130, one or more content provider systems 180, and one or more service provider systems 190. In one embodiment, mobile device 110 may be a mobile computing device, such as a mobile telephone, personal digital assistant, tablet computer, wearable device, etc. The anticipatory search server 130, one or more content provider systems 180, and one or more service provider systems 190 may also be computing devices, such as server computers, desktop computers, etc.

The mobile device 110, anticipatory search server 130, one or more content provider systems 180, and one or more service provider systems 190 may be coupled to a network 102 and communicate with one another using any of the standard protocols for the exchange of information. In one embodiment, mobile device 110 is coupled with network 102 via a wireless connection, such as a cellular telephone connection, wireless fidelity connection, etc.

In one embodiment, mobile device 110, anticipatory search server 130, one or more content provider systems 180, and one or more service provider systems 190 may run on one Local Area Network (LAN) and may be incorporated into the same physical or logical system, or different physical or logical systems. Alternatively, the mobile device 110, anticipatory search server 130, one or more content provider systems 180, and one or more service provider systems 190 may reside on one or more different LANs, wide area networks, cellular telephone networks, etc. that may be coupled together via the Internet but separated by firewalls, routers, and/or other network devices. In yet another configuration, the anticipatory search server 130, one or more content provider systems 180, and one or more service provider systems 190 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, mobile device 110 includes anticipatory homescreen browser 120, which is a user interface element of the mobile device that a user first interacts with when they open or power on mobile device 110. The anticipatory homescreen browser 120 enables the user to perform various tasks using the user interface to engage, select, view, and interact with data, applications, and functions of the mobile device. For example, the anticipatory homescreen browser 110 may enable the user to view news feeds from news applications, view email messages or message headers from one or more email accounts, view incoming call data, view social networking messages, statuses, updates, etc., as well as other functions/applications typically performed with mobile devices. As will be discussed in greater detail below, anticipatory homescreen browser 120 also provides access to a user to interact with anticipatory search system 132 to set preferences for anticipatory search, configure privacy settings for the sharing of, and access to, information by the anticipatory search system 132, as well as to configure other settings for anticipatory push search discussed herein.

In one embodiment, anticipatory homescreen browser 120 of the mobile device 110 interacts with an anticipatory search system 132 to enable the anticipatory search system 130 to predict and anticipate the functions, application, news, data, etc., that a user will want to access on the mobile device, and provide for the anticipated usage of the mobile device by the user. In one embodiment, the anticipatory search system 132 receives data collected by the anticipatory homescreen browser 120, such as user location data, application usage data, which applications are currently being used, user preference selection for anticipatory search, as well as other data, which reflects the real world usage conditions surrounding the usage of the mobile device 110. A user may also provide the anticipatory search system 120 with access credentials so that the anticipatory search system 132 can collect additional data from third party service provider systems 190, such as electronic mail providers, social networking services, user review websites, etc., that can also provide useful information associated with the user and/or usage of the mobile device.

From these various data sources, anticipatory search system 132 constructs a user profile that anticipates usage of the mobile device 110 by a user. In one embodiment, the predicted mobile device usage by a user may include applications that a user is likely to want to access on the anticipatory homescreen browser 120 at a given date, time, and/or location (e.g., at 11:30 AM on Tuesdays, the user typically accesses restaurant review and reservation applications on the anticipatory homescreen browser 120). The predicted mobile device usage by the user may also include an anticipated display of information that a user is likely to want to access (e.g., the user is interested in a specific news topic and will want to view news feeds on that topic in the anticipatory homescreen browser 120). The predicted mobile device usage may also include an order or arrangement in which data and/or applications are to be presented to the user on the mobile device (e.g., usage of the mobile device typically includes accessing news feeds and email before a social networking service application, and thus data should be arranged in this order on the anticipatory homescreen browser 120). It should be noted that these usage conditions of the mobile device 110 are provided as examples, as other predicted mobile device usages could be anticipated based on a constructed user profile, as discussed herein.

In one embodiment, anticipatory search system 132 utilizes the anticipated mobile device usage to publish content search requests to one or more content provider systems 180. In one embodiment, the content request searches are distributed to a communal area or information channel, which can be maintained by anticipatory search server 130, a service provider system 190, or other server computer system (not shown). The content provider systems 180 monitor the communal area for the content search requests relevant to content that can be supplied by the content provider systems 180. Continuing one of the examples above, several news content providers may listen to a content search request indicating a request for news on a specific topic, and may respond with the relevant information (e.g., a link to a news story on the content provider system 180, a text summary of the news story, etc.). One or more of the content provider systems 180 generate responses and provide those responses to the anticipatory search system 132.

Anticipatory search system 132 receives the responses and selects one or more of the received responses to be sent to the anticipatory homescreen browser 120 of the mobile device 110. In one embodiment, prior to the anticipatory search system 132 providing the responses to the anticipatory homescreen browser 120, anticipatory search system 132 ranks and selects a subset of received responses that are to be provided to the anticipatory homescreen browser 120. In one embodiment, the selection and ranking of the subset of responses is based on an anticipated relevance of the received response to the anticipated usage of the mobile device 110 by a user.

In one embodiment, the selection and/or ranking of the subset of responses by the anticipatory search system 132 can be influenced by a bid associated with a response. A bid can be a monetary amount specified by a content provider system 180 and associated with a specific search response, or can be a an amount pre-specified for all responses generated by a content provider system 180. Furthermore, pre-specified bid amounts can be adjusted on a response-specific basis as determined by content provider systems 180. In one embodiment, the bid amount can influence the selection and/or ranking of a search request response, but the bids cannot replace the relevancy analysis performed by the anticipatory search system 132 when selecting and/or ranking responses. For example, anticipatory search system 132 may publish a search request for recent news on Topic X, for which two content provider systems respond with stories on Topic X. If both stories are determined by anticipatory search system 132 to be relevant, a bid associated with one response and/or content provider can influence the ranking, and thus selection, of the story and/or placement above the other story in a news feed on anticipatory homescreen browser 120. However, if one response is determined by anticipatory search system 132 to be relevant to Topic X, but the other response is determined to be not relevant to Topic X, the non-relevant response will not be selected by anticipatory search system 132 even when it is associated with a pre-specified and/or response-specific bid.

After selection and/or ranking of search responses by anticipatory search system 132, the selected and/or ranked results are sent to anticipatory homescreen browser 120 for display to a user. The user may then read, select, and otherwise interact with the results within the anticipatory homescreen browser 120. In one embodiment, selection of specific results by a user in anticipatory homescreen browser 120 is returned to the anticipatory search system 132 for refining the user profile. Additionally, mobile device 110 and application usage data is continually, or periodically, collected by the anticipatory search system 132 to refine user profile of usage of a mobile device. That is, anticipatory homescreen browser 120 may be updated with search results provided by anticipatory search system 132 on a periodic basis or in response to a change in usage conditions at the mobile device 110.

Figure 2:
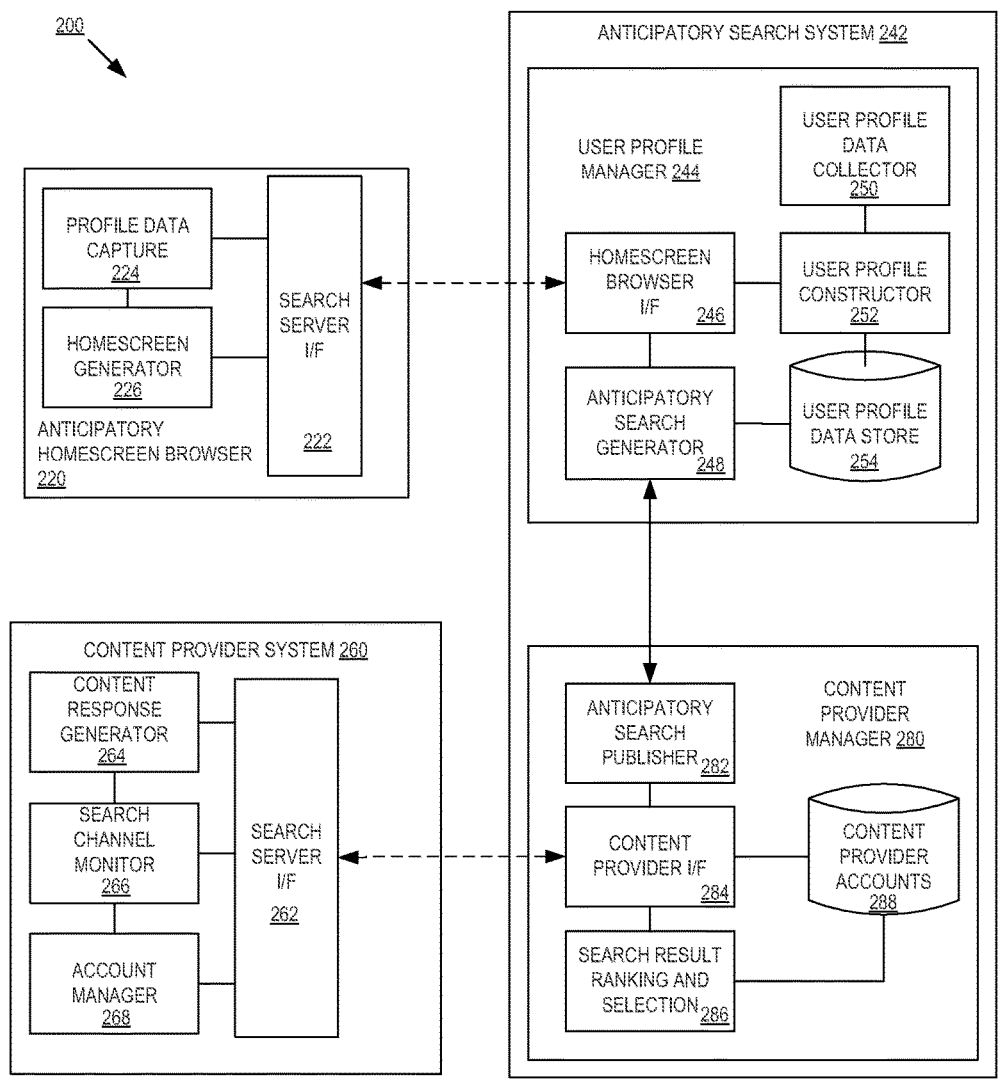
FIG. 2 is a block diagram of one embodiment of an anticipatory search system, a content provider system, and an anticipatory homescreen browser.

FIG. 2 is a block diagram of one embodiment 200 of an anticipatory search system 242, content provider system 260, and anticipatory homescreen browser 220. Anticipatory search system 242, a content provider system 260, and an anticipatory homescreen browser 220 provide additional details for the anticipatory search system, content provider systems, and anticipatory homescreen browser discussed above in FIG. 1.

In one embodiment, anticipatory homescreen browser 220 includes a search server interface 222, a profile data capture 224, and a homescreen generator 226. Content provider system 260 includes a search server interface 262, a content response generator 264, a search channel monitor 266, and an account manager 268. Anticipatory search system 242 includes a user profile manager 244, which includes a homescreen browser interface 246, anticipatory search generator 248, user profile data collector 250, user profile constructor 252, and user profile data store 254. Anticipatory search system 242 also includes a content provider manager 280, which includes an anticipatory search publisher 282, content provider interface 284, search result ranking and selection 286, and a content provider accounts 288 data store.

In one embodiment, anticipatory search system 242, content provider system 260, and anticipatory homescreen browser 220 communicate with each other over various networks and network configurations as discussed above in FIG. 1. Furthermore, although not illustrated, there may be multiple mobile devices executing anticipatory homescreen browsers and multiple content provider systems interacting with anticipatory search system 242. Thus, anticipatory search system 242 maintains user profile data store 254 and content provider accounts 288 to store user-specific and content provider-specific information, as discussed in greater detail below.

In the anticipatory homescreen browser 220, which may be executed on a mobile device (not shown), homescreen generator 226 is responsible for generating a user interface for the anticipatory homescreen browser 220. The generated user interface can include a user interface that enables a user to set up and configure an account with the anticipatory search system 242. In one embodiment, during account setup or options configuration, homescreen generator 226 displays configurable settings, such as frequency of anticipatory homescreen browser updates, user privacy settings, specification of associated third party service providers and user credentials for accessing the service providers, user password management, anticipatory homescreen browser layout preferences, as well as other configurable settings of the anticipatory homescreen browser 220 and the anticipatory searches/results to be generated by anticipatory search system 242. The user settings can be stored by the anticipatory homescreen browser in a memory of a mobile device, and may also be communicated from the anticipatory homescreen browser 220 to anticipatory search system 242 via interfaces 222 and 246, and stored in user profile data store 254.

After a user account has been created with the anticipatory search system 242, profile data capture 224 begins capturing data associated with the user and usage of the mobile device. In one embodiment, the data capture is consistent with one or more privacy settings selected by the user. The captured data can include one or more of positioning data, text data captured from email messages, text messages, social networking posts, etc., application data such as what applications are installed on the user's mobile device, which applications are currently open, frequency of usage, what data is being accessed by the applications, etc., preference data obtained from other applications, etc.

The captured profile data is then transmitted by anticipatory homescreen browser 220 to user profile manager 244 of anticipatory search system 242. User profile constructor 242 receives the user profile data and stores it in user profile data store 254. In one embodiment, based on the permissions and authorizations associated with a user, user profile data collector 250 may also collect user profile data from third party service provider systems (not shown). These third part provider systems may include, for example, electronic mail provider systems, social networking systems, blogging systems, microblogging systems, as well as other systems. In one embodiment, authorizations, such as user credentials for a service provider or secure access protocol credentials (e.g., O-Auth credentials), as well as user preferences for accessing the third party service providers, are also stored in user profile data store 254.

Collected user profile data is analyzed by user profile constructor 252 to determine a predicted and anticipated usage of a mobile device. The anticipated usage of the mobile device can include one or more of information likely to be accessed on the mobile device, applications likely to be launched, what data will populate the launched applications, applications of use to be suggested to the user, etc. For example, analysis of user profile data may indicate that the user frequently accesses a news feed application on their mobile device, and further that the user's social networking account and microblogging account both reference a current event. User profile constructor 252 determines, from the user profile data, that an intended use of the mobile device by the anticipatory homescreen browser 220 will be to view news feeds on the current event. In one embodiment, anticipated usage(s) of a mobile device by a user are stored in user profile data store for the subsequent generation of content search requests, as discussed below.

In one embodiment, user profile constructor 252 applies machine learning based analysis, such as for example Hidden Markov Models and Support Vector Machines, to the captured user profile data stored in user profile data store 254. The machine learning based analysis performed by user profile constructor enables a profile to be generated that recognizes patterns, as well as specific information, of mobile device usage. In one embodiment, when a user account is initially created and/or there is a minimum amount of user data available, the machine learning based analysis begins with a generalized model for constructing a user profile. However, as more user profile data is collected from anticipatory homescreen browser 220 and user profile data collector 250, the machine learning model associated with a user evolves into a user-specific model. Thus, in one embodiment, each user of the anticipatory search system 242 is associated with a single, user-specific machine learning model for anticipating a specific user's usage of a mobile device. User profile constructor 252 utilizes the machine learning model to analyze the corpus of collected user profile data for anticipated usage of a mobile device, specific information that a user is predicted to be interested in for the anticipated usage, etc. Furthermore, the machine learning model adapts anticipated usage and predicted information over time as usage habits change, and the information determined to be relevant to a user changes. For example, a user may access a music streaming application on their mobile device at a specific time of day, and listen to a specific genre of music. Music purchases or music streaming apps could be suggested to the user via the anticipatory homescreen browser 220 based on this information. As the user's preference for genres of music changes, however, the suggestions may change accordingly. Furthermore, a streaming music application can be automatically selected and launched within the anticipatory homescreen browser based on the determined time when a user is predicted to use the application.

Based on a determined anticipated usage of the mobile device stored in user profile data store 254, anticipatory search generator 248 periodically generates content search requests. The content search requests reflect the anticipated usage of a mobile device by a user to access specific applications on the mobile device, request specific information, utilize specific services through the mobile device, etc., as determined from the collected and analyzed user profile data. In one embodiment, the content search requests are formed as specially formatted messages, for example XML formatted messages. The content search requests are then provided to the anticipatory search publisher 282, which publishes the content search requests to a communal messaging space. For example, a message repository maintained by anticipatory search system or a third part system may temporarily store content search request messages until a certain number of responses are received or a specific amount of time has passed.

In one embodiment, search channel monitor 266 of a content provider system 260 watches the communal message space. The search channel monitor 266 analyzes the published content search requests to locate requests relevant to a service or information provided by the content provider system 260. For example, when a content provider system is an event coordination provider, search channel monitor 266 determines when a content request may be relevant to potential social events, as opposed to news feed content requests. When search channel monitor 266 finds a relevant content search request, content response generator 264 is instructed to generate a content response based on the request. Continuing the above example, a content search request could indicate a user is looking for an event in Las Vegas, Nev. Content response generator 264 would generate a response including the requested event information for the relevant location, and additionally based on preferences specified in the message. In one embodiment, the content search request generated by anticipatory search generator 248 may additionally specify one or more elements of user-specific information (e.g., as obtained from a user profile or a user's mobile device) that is relevant to the response to be generated by content response generator 264. The user-specific information could include any of the collected user profile data, such as user location, as well as machine learning model analysis user profile data, such as user preferences, habits, etc. Content response generator 264 is thus able to generate and provide a relevant and targeted content response to content provider manager 280.

In one embodiment, as discussed above, content provider system 260 has an account with content provider manager that may specify a pre-existing bid for content responses. The bid may influence the ranking and/or selection of content responses by the anticipatory search system 242. Furthermore, response generator 264 can select to modify an existing bid, or add a bid to a specific content response, based on various factors, such as relevance of a content search request to the content provider system, user profile data indicative of value to content provider system for a specific response, a goal of a content provider system to reach a specific audience (e.g., based on the content search requests), as well as other factors.

For received content responses, search result, ranking, and selection 286 further analyzes the content responses to ensure they are relevant to the content search request. That is, content provider manager 280 ensures that non-relevant messages are not passed on to a user. In one embodiment, the received responses may be selected and/or ranked based on the determined relevance, and such ranking and selection modified by pre-existing or response-specific bids. The bids for selected messages, as well as modifications to existing bids, are stored in content provider accounts 288 data store. The account manager 268 and the content provider manager 280 may then settle content provider system 260 accounts on a periodic basis.

After ranking and selection, the responses are provided to user-profile manager 244. The content responses are then transmitted to homescreen generator 226 for display on a mobile device. In one embodiment, content responses are sent to anticipatory homescreen browser 220 on a periodic basis, or as usage conditions on a mobile device change.

Furthermore, the responses are analyzed by homescreen generator 226, which determines which applications should be used to display the responses, and how the display of the responses should be configured in the anticipatory homescreen browser 220. Furthermore, because the response are based on captured user profile data, which is analyzed to anticipate usage and data of interest to the user, the displayed content responses within the anticipatory homescreen browser 220 are likely to be relevant to the current usage conditions of the mobile device, the user's tastes, the user's preferences, etc., without requiring a user to request the services, data, applications, etc. Furthermore, the content supplied to, and displayed on the anticipatory homescreen browser 220 automatically adapts to the user's usage patterns, preferences, tastes, etc., again without requiring the user to make corresponding changes. Thus, the anticipatory homescreen browser 220 anticipates the needs of a user of a mobile device, predicts the information and applications that will be relevant to the user's needs, and provides this information and/or launches those applications in a seamless and unobtrusive manner within the anticipatory homescreen browser 220.

In one embodiment, although not illustrated, one or more processes of the user profile manager 244 may be performed by the anticipatory homescreen browser 220. For example, anticipatory homescreen browser 220 may be responsible for collecting all forms of user profile data and constructing a user profile for the user of a mobile device. As another example, anticipatory homescreen browser 220 may also generate the anticipatory search requests that are provided to the content provider manager 280 of anticipatory search system 242. Consistent with the discussion herein, any or all of the functions and processes performed by the anticipatory homescreen browser 220 and anticipatory search system 242 may be distributed between the anticipatory homescreen browser 220 and anticipatory search system 242.

Furthermore, although not illustrated, search channel generator 264 search channel monitor 266, and account manager 268 may implemented by the anticipatory search system 242 on behalf of one or more content provider systems. For example, smaller content providers, or those that do not desire to monitor and respond to the content search requests on their own servers, may establish an account with anticipatory search system 242 to perform the content response generation discussed above. Furthermore, a mix of systems, some content provides performing their own monitoring and response generation, and some content providers having the anticipatory search system perform monitoring and response generation, may be implemented consistent with the discussion herein.

Figure 3:
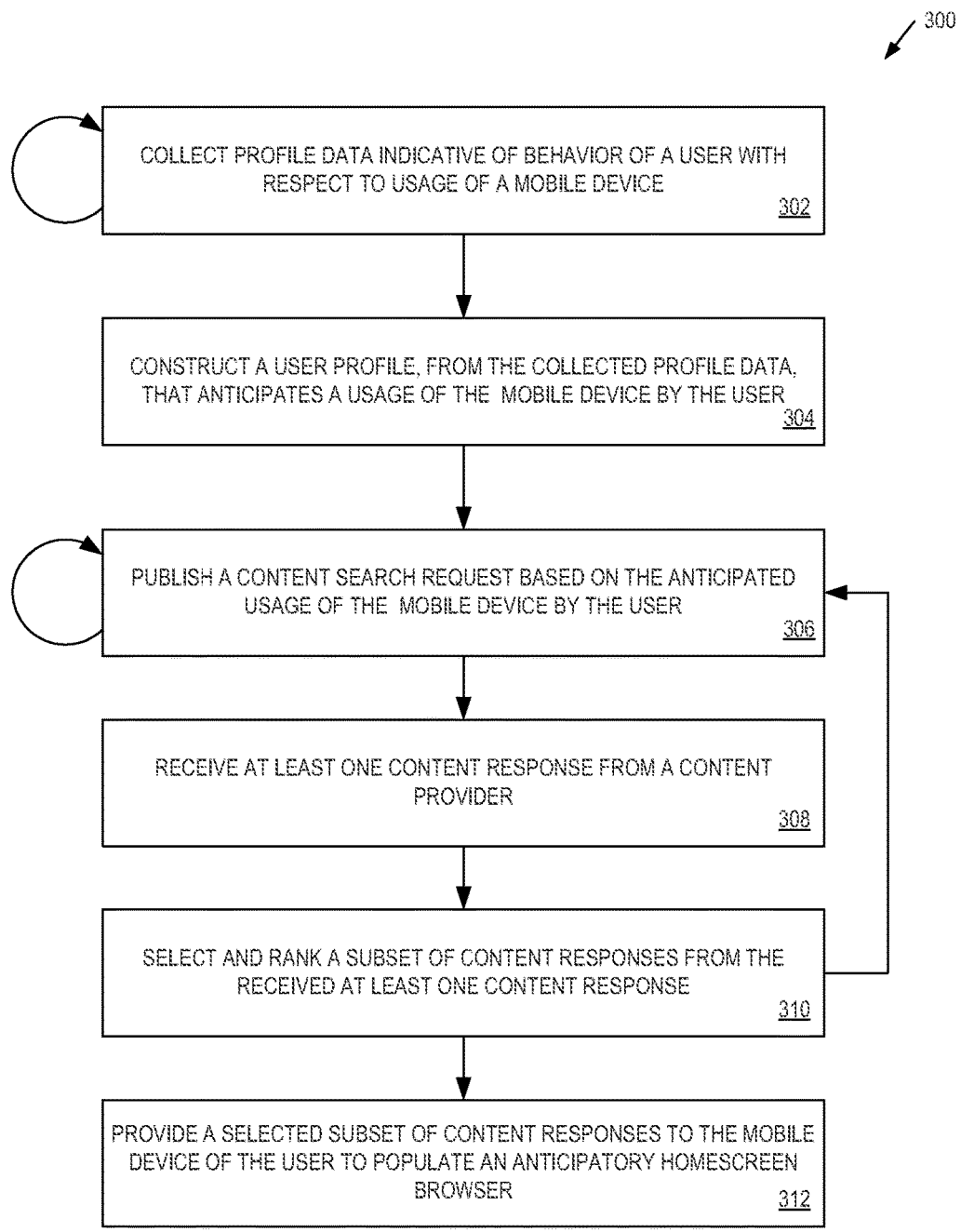
FIG. 3 is a flow diagram of one embodiment of a method for performing anticipatory search for generation of an anticipatory homescreen browser for a user device.

FIG. 3 is a flow diagram of one embodiment of a method 300 for performing anticipatory search for generation of an anticipatory homescreen browser for a user device. The method 300 is performed by processing logic that may comprise hardware (circuitry, dedicated logic, etc.), software (such as is run on a general purpose computer system or a dedicated machine), firmware, or a combination.

Referring to FIG. 3, processing logic begins by collecting profile data indicative of behavior of a user with respect to usage of a mobile device (processing block 302). In one embodiment, profile data, such as user location data (e.g., GPS data), data indicative of installed applications, data indicative of open/running applications, data indicative of a user obtained from various applications (e.g., age, profession, etc. entered into an application), text data (e.g., text from social networking messages, email messages, text messages, blog posts, etc.), call logs, as well as other forms of user data relevant to constructing a profile associated with usage of a mobile device, is received from a mobile device. In one embodiment, profile data indicative of usage of the mobile device by a user may also be proactively collected by processing logic from third party service providers, such as email message content obtained from email service providers, blogging and microblogging post content collected from blogging service providers, music streaming history and preferences gathered from music services providers, movie watching history and preferences gathered from online movie streaming services, a history of restaurants or bars visited from review and/or reservation service providers, as well as other service providers.

Processing logic constructs a user profile, from the collected profile data, that anticipates a usage of the mobile device by the user (processing block 304). As discussed herein, usage of the mobile device refers not only to the functional usage of applications, or services of the mobile device, but also to the data accessed, viewed, or entered by the user on the mobile device. Thus, the user profile data indicative of usage of the mobile device can be understood to mean a comprehensive profile of how a user uses a mobile device. Furthermore, the user profile data can be continuously or periodically collected at processing block 302, and thus an evolving and comprehensive user profile for usage of the mobile device can be developed and updated as usage of the mobile device changes (e.g., as new applications are installed, user preferences change, etc.).

In one embodiment, the user profile is formed by performing intent mining on the corpus of collected user profile data. In one embodiment, intent mining is performed by machine learning model based analysis of, for example, text from data viewed or exchanged by the user, a user's location with respect to applications used and/or viewed on a mobile device, which applications are most commonly opened by a user, typical user search requests, etc. For example, Latent Dirichlet Allocation can be used to determine topics of interest from the emails received/sent by a user and/or Agglomerative Clustering used to mine locations of interest from the user's reported location data. In one embodiment, a generalized model for intent mining is initially used for each user of an anticipatory search system. However, as more user profile data is collected, and more is learned about the anticipated intended usage of a mobile device by a user, the machine learning model adapts to a user-specific model over time. Thus, the longer processing logic performs user profile construction for a specific user, the more accurate the user-specific model gets at anticipating the intended usage of the mobile device by the user.

An example of an anticipated usage of a mobile device by a user can include viewing specific news stories. That is, based on machine learning-based textual analysis of a user's email messages and blogging posts, it may be determined during user profile construction, that the user has a specific interest in political events from a specific country. Thus, when the user views their anticipatory homescreen browser, processing logic as discussed herein, can anticipate that the user will likely want to view news stories or updates on the political events from the specific country.

As another example of anticipated usage of a mobile device by a user, usage of a mobile device can include listening to specific genres of music or specific artists. From the collected profile information, usage of a mobile device can indicate that user has purchased several music albums by a specific artist or favors the content from that artist while running to a music streaming app. Processing logic can anticipate that the user would be interested in new (or unpurchased) releases by the artist, which it can inform the user about, suggest the user purchase, offer to stream music from a streaming music application, etc. within the anticipatory homescreen browser.

Processing logic then publishes a content search request based on the anticipated usage of the mobile device by the user (processing block 306). In one embodiment, the anticipated usage forms the basis of a query for anticipated content. Continuing the examples above, "What is the latest news in Canada?", "Does Drake have a new album out?", "What Mediterranean restaurants are near my current location, and can I get a reservation?", as well as other queries, are examples of information that may be relevant to an anticipated usage of a mobile device by a user. In each example, automatically and without specific action by a user, content search requests by an anticipatory search system proactively obtain data, applications, suggestions, etc. that are likely to be used on a mobile device by a user.

At least one response is received by processing logic (processing block 308). In one embodiment, as discussed herein, the content search requests are published to a communal location at which a plurality of content providers monitor. The content providers may then view the queries, determine which are relevant to the content that they provide, and respond accordingly. For example, when a content search request seeks recent news on a current event, several news agencies could respond, but music distribution services could ignore such irrelevant requests. However, it should be noted that there may be circumstances when several different types of service providers may want to respond to the same content search request. The search responses can include links to relevant content, data to populate applications on the mobile device, the content itself, coupons, as well as other data.

In one embodiment, because multiple service providers may respond to the same query, the service providers may augment their responses with bids. As discussed herein, a bid is a monetary amount that impacts a search response. The impact can influence ranking, and thus selection, of the content provided in search responses, as discussed below.

Processing logic selects and ranks a subset of responses from the received at least one response (processing block 310). In one embodiment, when more than one response to a query is received, processing logic can determine which response(s) to provide to an anticipatory homescreen browser. Selection among potential responses is based on relevance to the corresponding content request search. For example, when response to the query "What restaurants are near me?" are "MCDONALDS™" and "the library," processing logic can exclude the results that are not relevant to the initial query (e.g., the library). The selected responses can then be ranked based on the determined relevance of the response to the query, and based in part on a bid included with the response, if any. When multiple responses are each associated with bids, the amount of the bid may further influence ranking of the received responses.

A selected subset of responses is then provided by processing logic to the mobile device of the user to populate an anticipatory homescreen browser (processing block 312). In one embodiment, the subset is selected from the ranked responses based on a desired number of responses. For example, an anticipatory homescreen browser may be able to display the data provided from four different news feed services, but may only launch a single music streaming app. Furthermore, the responses in the subset are configured for use by the anticipatory homescreen browser. For example, if a response to "What restaurants near me?" includes a response from a reservation service provider, the response could be configured to open within the anticipatory homescreen browser, or suggest opening of the corresponding application by a notification in the anticipatory homescreen browser, on the mobile device. As another example, when the anticipatory homescreen browser of a mobile device includes news feeds displayed to the user, the response can automatically populate the news feeds with the stories anticipated to be of interest to the user. Furthermore, when a bid influences the selection and/or ranking of a response that is used to populate part of the anticipatory homescreen browser, in one embodiment, a notification that the response is paid-for or sponsored can be included in the corresponding content displayed.

Figure 4:
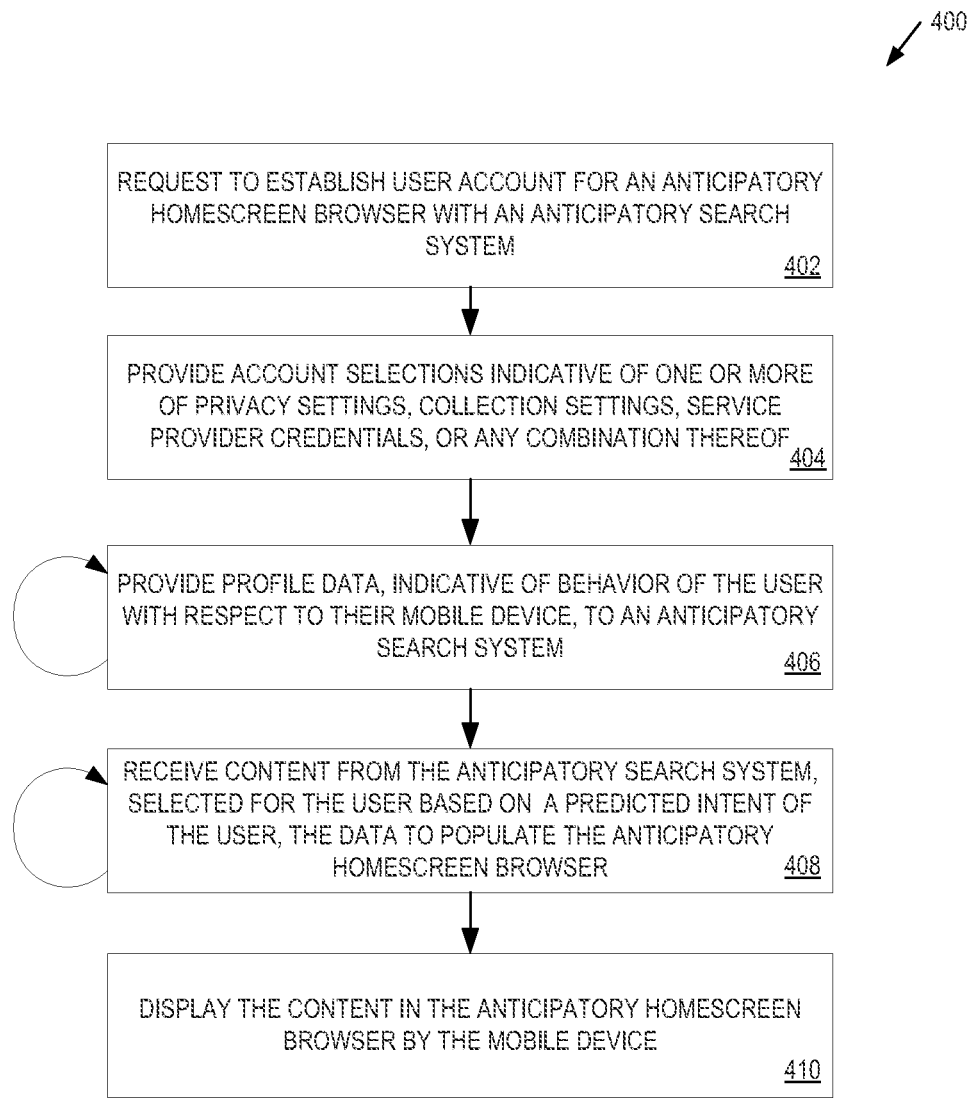
FIG. 4 is a flow diagram of one embodiment of a method for establishing a user account and handling anticipatory homescreen search results on a mobile device.

FIG. 4 is a flow diagram of one embodiment of a method 400 for establishing a user account and handling anticipatory homescreen search results on a mobile device. The method 400 is performed by processing logic that may comprise hardware (circuitry, dedicated logic, etc.), software (such as is run on a general purpose computer system or a dedicated machine), firmware, or a combination. In one embodiment, the method 400 may be performed by an anticipatory homescreen browser run on a mobile device.

Referring to FIG. 4, processing logic begins by requesting to establish a user account for an anticipatory homescreen browser with an anticipatory search system (processing block 402). In one embodiment, the request may include establishing a user identification and password subsequent to the installation of the anticipatory homescreen browser on a mobile device. Processing logic then provides account selections indicative of one or more of privacy settings, collection settings, service provider credentials, or any combination thereof to the anticipatory search system (processing block 404). In one embodiment, a user may configure which information they wish to share with the anticipatory search system, what service should be involved in the information sharing, how frequently information is gathered by the anticipatory homescreen browser and/or the anticipatory search system, etc. Thus, the user retains as much control over their own privacy as they desire. In one embodiment, the account settings can be updated by the user at any time.

After the account is established and the account selections are made, processing logic provides profile data, indicative of behavior of the user with respect to their mobile device, to an anticipatory search system (processing block 406). As discussed herein, this could include transferring call log data, text message data, location data, application installation data, application usage statistics, which applications are currently open, what data is being used by the open applications, what user preferences are stored within those application, as well as other data indicative of usage of the mobile device by the user. The profile data is provided to the anticipatory search system on a periodic or regular basis. As discussed herein, the profile data enables the anticipatory search system to gain insights into what data/applications a use of a mobile device typically uses/accesses, when, and in what geographic location.

Processing logic receives content from the anticipatory search system, selected for the user based on a predicted intent of the user, where the data is to populate the anticipatory homescreen browser (processing block 408). The content is then displayed in the anticipatory homescreen browser by the mobile device (processing block 410). The responses are intended to anticipate a likely usage of the mobile device, and the responses automatically, and without a request of the user, populate the anticipatory homescreen browser user interface. For example, one or more of news feeds anticipated to be of interest to a user, applications likely to be launched by a user, music selections of relevance to a user, etc. may all be automatically displayed to the user for the user to interact with. As another example, a user may typically check his email at 8 AM each morning, in which case email headers for recently received messages can populate the anticipatory homescreen browser around that specific time.

Figure 5:
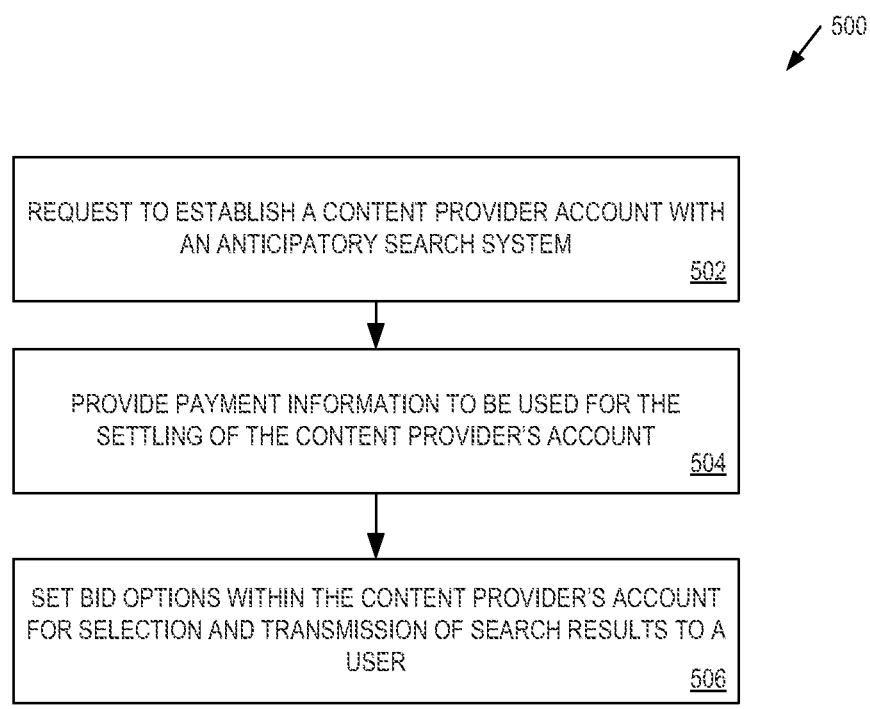
FIG. 5 is a flow diagram of one embodiment of a method for generating an account by a content provider.

FIG. 5 is a flow diagram of one embodiment of a method 500 for generating an account by a content provider. The method 500 is performed by processing logic that may comprise hardware (circuitry, dedicated logic, etc.), software (such as is run on a general purpose computer system or a dedicated machine), firmware, or a combination. In one embodiment, the method 500 may be performed by a content service provider and/or an anticipatory search system.

Referring to FIG. 5, processing logic begins by requesting to establish a content provider account with an anticipatory search system (processing block 502). In one embodiment, the account is established by content providers to gain access credentials to the communal location in which content search requests are published. Furthermore, additional information, such as formatting of content search requests, required formatting of content responses, communication protocols, etc. may also be received by content provider systems upon establishing a content provider account.

Processing logic can further provide payment information to be used for the settling of the content provider's account (processing block 504). As discussed herein, the content providers can optionally include bids with content responses. When content responses that include bids are selected and sent to users, an accounting is performed, and the payment information used to settle such accounts.

Processing logic may also set bid options within the content provider's account for selection and transmission of search results to a user (processing block 506). In one embodiment, bid options such as a standard search response bid modifier amount, a maximum bid total for a given period of time, bid modifiers to be used in certain circumstances, enable discretionary bid modification, etc. may all be selected, revised, added, and removed by content providers. These bid option settings can then be applied to future content responses by the content provider, as discussed herein.

Figure 6:
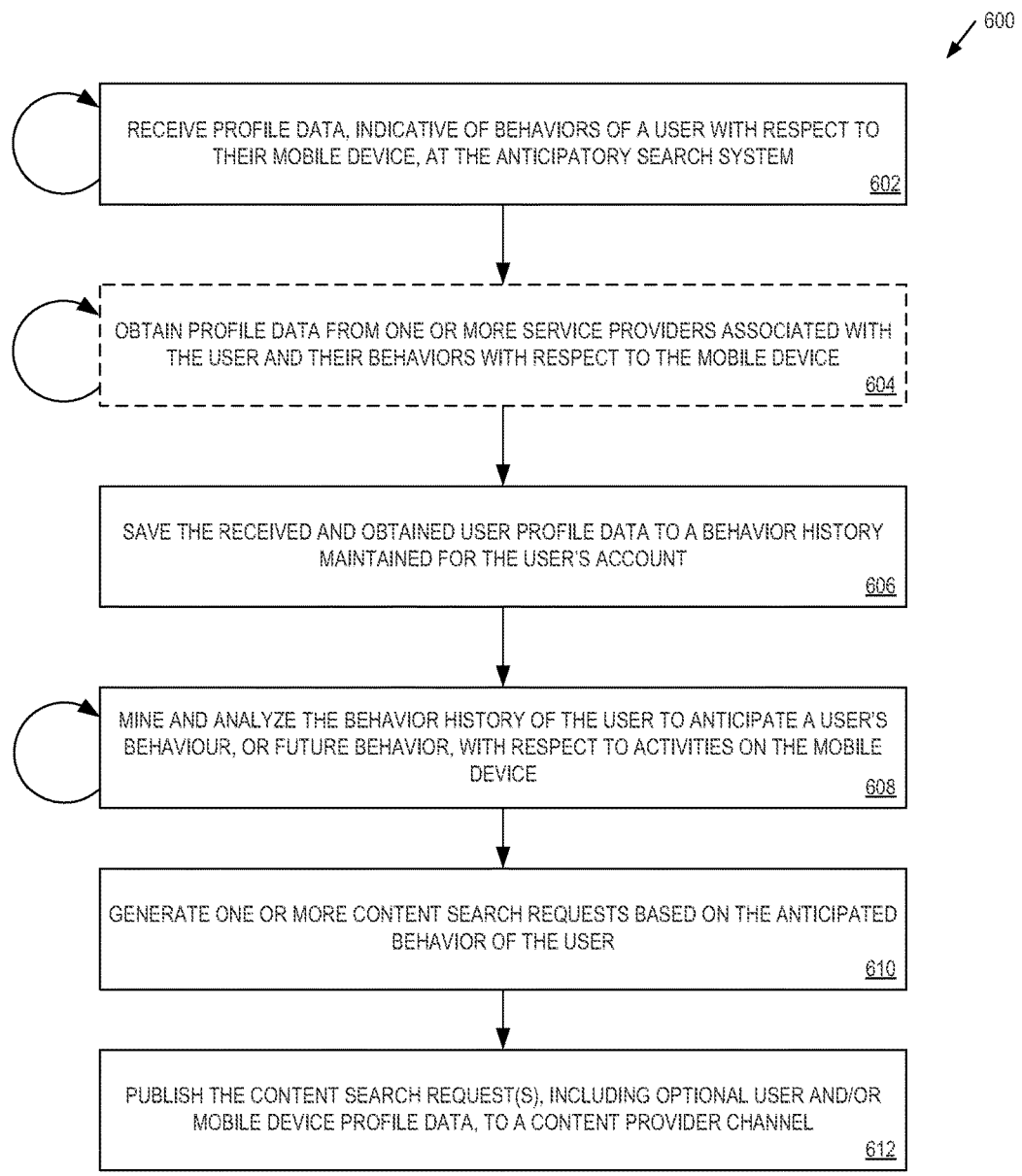
FIG. 6 is a flow diagram of one embodiment of a method for publishing anticipatory content search requests by an anticipatory search system.

FIG. 6 is a flow diagram of one embodiment of a method for publishing anticipatory content search requests by an anticipatory search system. The method 600 is performed by processing logic that may comprise hardware (circuitry, dedicated logic, etc.), software (such as is run on a general purpose computer system or a dedicated machine), firmware, or a combination. In one embodiment, the method 600 may be a content service provider and/or an anticipatory search system.

Referring to FIG. 6, processing logic begins by receiving profile data, indicative of behaviors of a user with respect to their mobile device, at an anticipatory search system (processing block 602). As discussed herein the profile data is data and/or information indicative of usage of a mobile device by a user and can include location data, text, call logs, application data, etc. provided by a mobile device to the anticipatory search system. Processing logic optionally obtains profile data from one or more service providers associated with the user and their behaviors with respect to the mobile device (processing block 604). The service providers can be third party service providers that provider services, such as email messaging, blogging, microblogging, photo sharing, video sharing, music streaming, music distribution, etc. to a mobile device for a user. In one embodiment, the services are supplied as data for the services running on corresponding applications on the mobile device (e.g., music to be played on the mobile device in a music streaming app, photos stored on a remote server that are displayed in an application, microblogging posts generated or read by a user within an application or via an online account, etc.). Processing blocks 602 and 604 are periodically repeated based on selected configuration settings of a user.

Processing logic saves the received and obtained user profile data to a behavior history maintained for the user's account (processing block 606). The saved user profile data forms a behavior history that is periodically mined and analyzed to anticipate a user's current or future behavior with respect to activities on the mobile device (processing block 608). The anticipated behavior can include any number of user behaviors with respect to the mobile device, such as data likely to be accessed, applications likely to be used, services likely to be used, etc.

Processing logic generates one or more content search requests based on the anticipated behavior of the user (processing block 610), and publishes those content search request(s), including optional user and/or mobile device profile data, to a content provider channel (processing block 612). In one embodiment, content requests are based on machine learning based analysis of user profile data, to gain insights into usage patterns, likely information to be accessed, etc. However, additional data, such as current applications open on a mobile device, what applications are installed on a mobile device, text entered by a user on the mobile device, actions currently being performed on the mobile device, etc. can also be used by processing logic when generate content search requests. Because content requests can include user and/or mobile device information, in one embodiment, one or more additional safeguards to a user's privacy are utilized when publishing such content requests, or publishing such request to specific content providers. The requests may require a user's opt-in via consent (e.g., "Would you like to tell ABC concert tickets provider about your favorite artists so that you can get ticket offers for your favorite artists' concerts?"). The requests may additionally or optionally employ encryption, using one-time keys or unique identifiers for the transmission of the requests and responses.

Figure 7:
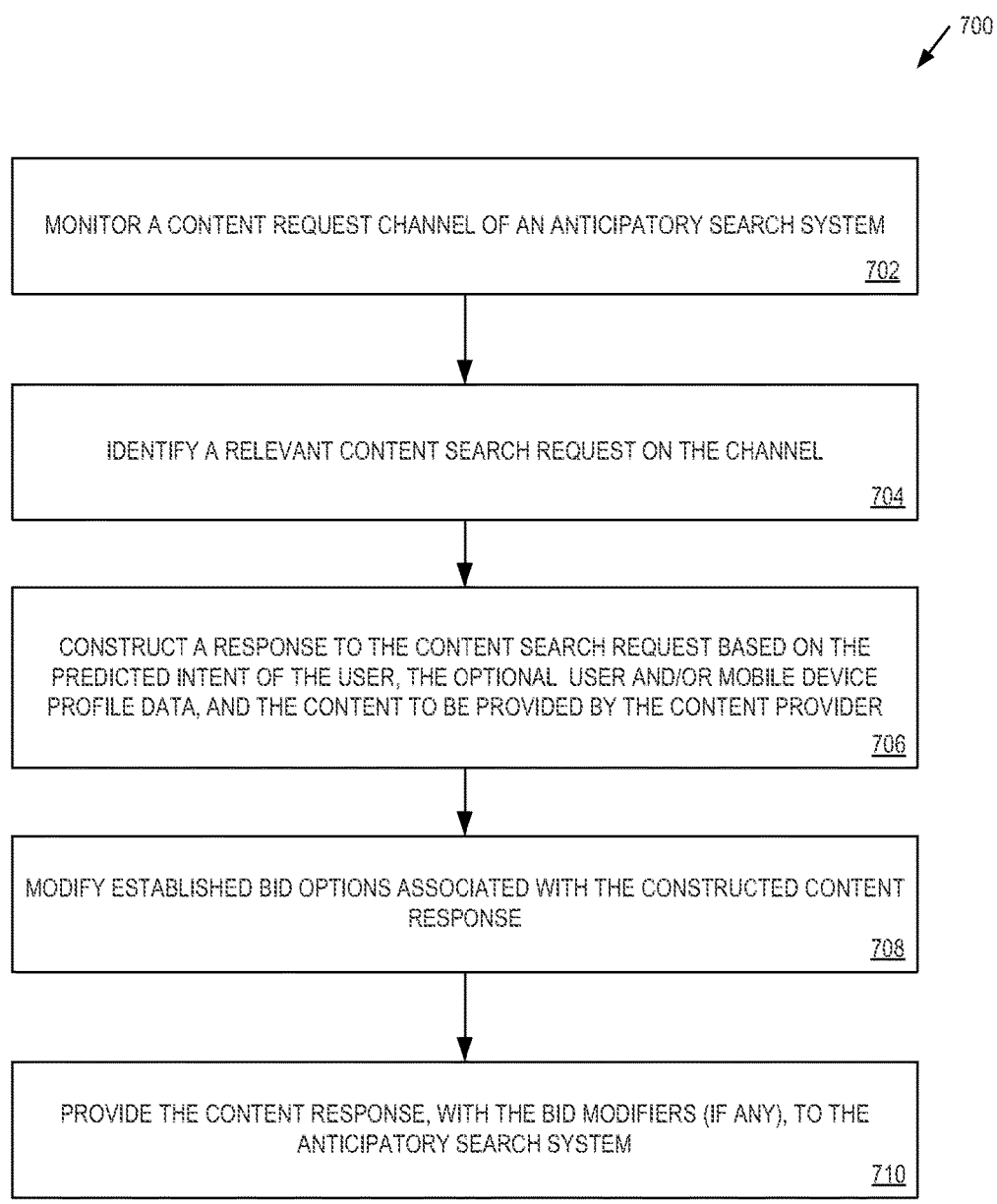
FIG. 7 is a flow diagram of one embodiment of a method for responding to anticipatory content search requests by a content provider system.

FIG. 7 is a flow diagram of one embodiment of a method 700 for responding to anticipatory content search requests by a content provider system. The method 700 is performed by processing logic that may comprise hardware (circuitry, dedicated logic, etc.), software (such as is run on a general purpose computer system or a dedicated machine), firmware, or a combination. In one embodiment, the method 700 may be performed by a content service provider and/or an anticipatory search system. As discussed above, in embodiments, a content provider system (e.g., content provider system 260 can perform all of the processes described in FIG. 7, an anticipatory search system (e.g., anticipatory search system 242) can be configured to perform all of the processes described in FIG. 7, or the processes described in FIG. 7 can be distributed between a content service provider and an anticipatory search system.

Referring to FIG. 7, processing logic begins by monitoring a content request channel of an anticipatory search system (processing block 702). As discussed herein, the content request channel may be a communal location on a computing network where content requests are transmitted and/or stored. The communal area is open to plurality of content providers, and as discussed below, it is the content provider's responsibility to monitor content search requests, detect requests relevant to the content provider, and generate responses with appropriate content.

Processing logic identifies a relevant content search request on the channel based (processing block 704). In one embodiment, the identification involves analyzing the anticipated usage of a mobile device by a user in the content search request for relevance to data and/or services provided by the content provider. Furthermore, when such requests include additional user and/or application data, the additional information can be also be used to identify relevant content requests.

Processing logic then constructs a content response to the content search request based on the predicted intent of the user, the optional user and/or mobile device profile data, and the content to be provided by the content provider (processing block 706). In one embodiment, the constructed response may include data anticipated to be relevant to usage of the mobile device the user, an instruction to open an application anticipated to be relevant to usage of the mobile device the user, as well as other information anticipated to be relevant to usage of the mobile device the user. For example, an application service provider may suggest their app to user when it is determined that the app would be relevant to the anticipated usage of the mobile device, but the app is not installed on the mobile device.

Processing logic optionally modifies established bid options associated with the constructed response (processing block 708). In one embodiment, content providers can establish various default bid options for their content responses, when selected and provided to mobile devices. The bid options may be modified by the content providers to increase or decrease the bid based on the identification of relevance at processing block 704. That is, some content responses may be deemed by a content provider as more important than a typical response, and thus the content provider may want to increase a default bid based on this perceived importance. Similarly, some bids may be reduced or eliminated due to a lack of relevance. For example, a concert promoter service may establish a bid amount $X for all content responses relevant to their services. However, if a content response involves an upcoming concert with tickets available, the content promotor service can increase their bid (e.g., $X+$Y) to reflect the imminent date of the concert of the availability of tickets. Conversely, a concert promoter may decrease or eliminate a standard bid for an upcoming concert that is not in line with a user's determined music preferences.

Processing logic provides the content response, with the bid modifiers (if any), to the anticipatory search system (processing block 710).

Figure 8:
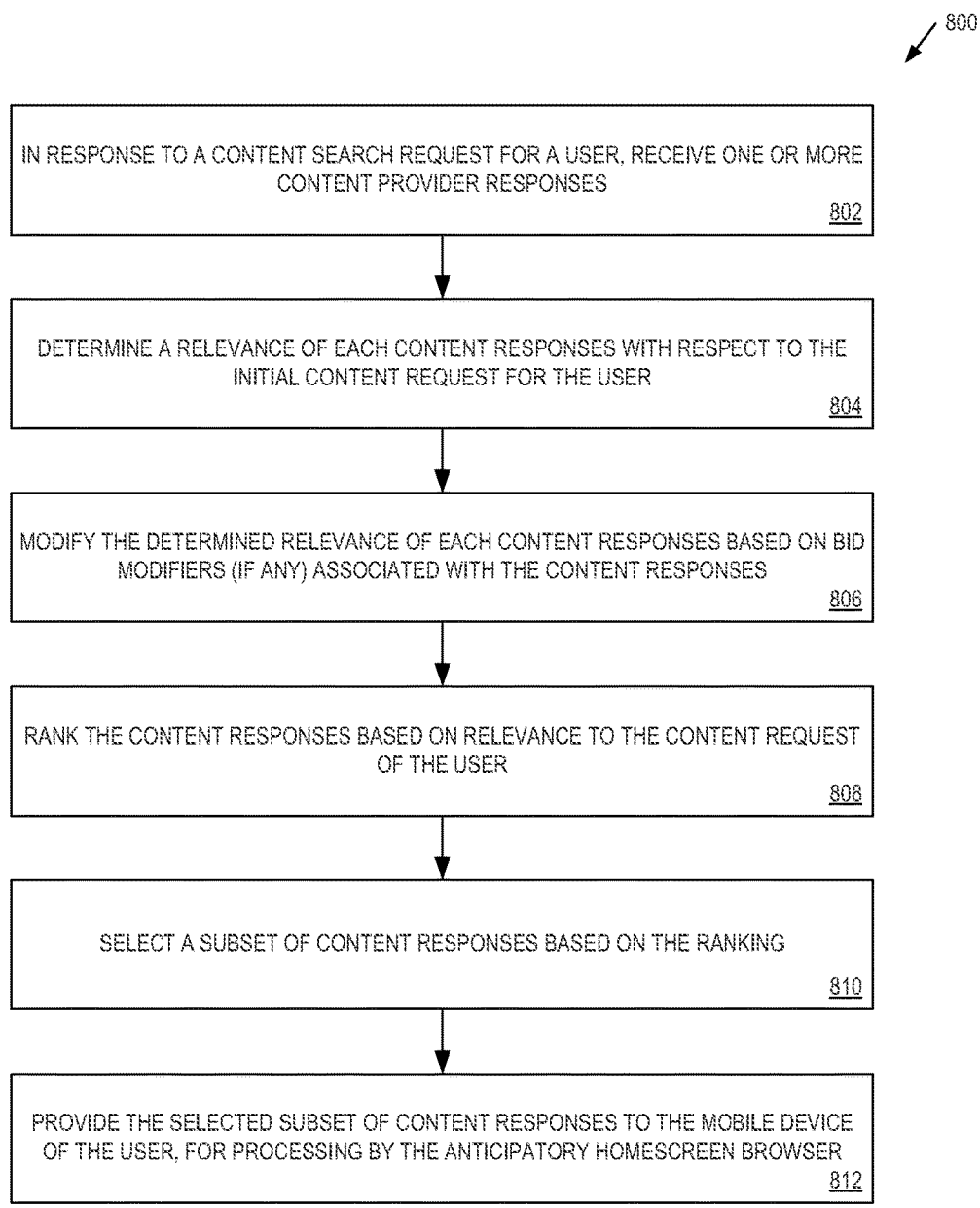
FIG. 8 is a flow diagram of one embodiment of a method for selecting and providing anticipatory search results by an anticipatory search system to a mobile device.

FIG. 8 is a flow diagram of one embodiment of a method 800 for selecting and providing anticipatory search results by an anticipatory search system to a mobile device. The method 800 is performed by processing logic that may comprise hardware (circuitry, dedicated logic, etc.), software (such as is run on a general purpose computer system or a dedicated machine), firmware, or a combination. In one embodiment, the method 800 may be performed by a an anticipatory search system.

Referring to FIG. 8, processing logic begins by receiving content provider responses for content search requests (processing block 802). The responses correspond to specific content search requests based on anticipated usage of a mobile device by a user of an anticipatory homescreen browser. The responses may be generated by a plurality of different content providers providing different content purported to be relevant to the corresponding request.

Processing logic determines a relevance of each content response with respect to the initial content request (processing block 804). In one embodiment, the relevance can be based one or more of text analysis, topic similarity analysis, machine learning model analysis, as well as other approaches that rank the relevance with respect to the user's profile and/or the original content search request. Processing logic modifies the determined relevance of each content response based on bid modifiers (if any) associated with the content responses (processing block 806), and ranks the content responses based on the relevance to the content requests (processing block 808).

Processing logic selects a subset of content responses based on the ranking (processing block 810). In one embodiment, the subset is selected based on a configuration and/or layout of the anticipatorily homescreen browser for which the results are to be sent. For example, when the results relate to news feeds to be supplied to an anticipatory homescreen browser, which is configured to display four newsfeeds, then the four highest ranked content responses are selected for delivery. However, when the results relate to an application to be launched, then processing logic may select the single highest ranked application from among the available applications to launch in the anticipatory homescreen browser.

Processing logic provides the selected subset of content responses to the mobile device of the user, for processing by the anticipatory homescreen browser on the mobile device (processing block 812).

Figure 9:
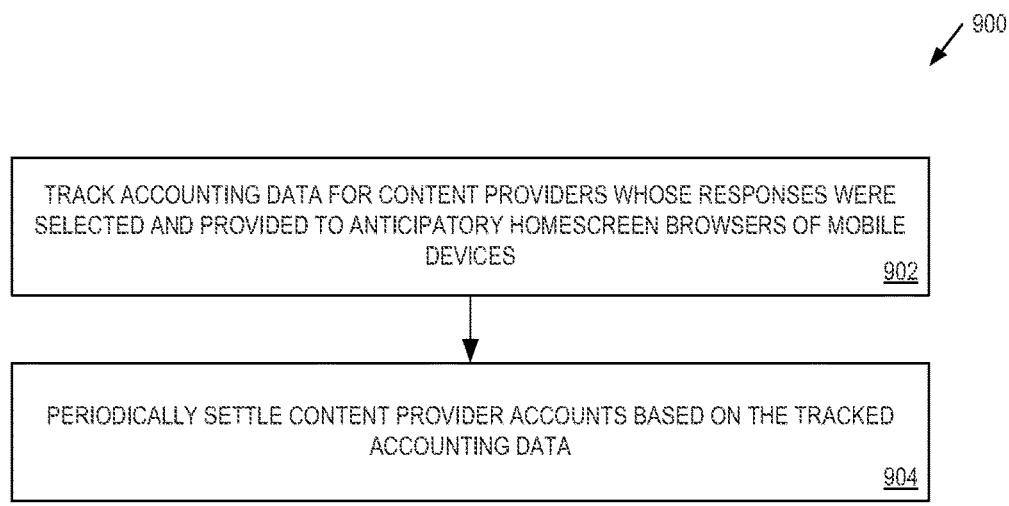
FIG. 9 is a flow diagram of one embodiment of a method for managing accounting by an anticipatory search system.

FIG. 9 is a flow diagram of one embodiment of a method 900 for managing accounting by an anticipatory search system. The method 900 is performed by processing logic that may comprise hardware (circuitry, dedicated logic, etc.), software (such as is run on a general purpose computer system or a dedicated machine), firmware, or a combination. In one embodiment, the method 900 may be performed by an anticipatory search system.

Referring to FIG. 9, processing logic begins by tracking accounting data for content providers whose responses were selected and provided to anticipatory homescreen browsers of mobile devices (processing block 902). In one embodiment, the content providers' accounts are updated in a content provider accounts data store to reflect the number of content response selected and delivered to a user, whether the user selected the delivered content, or otherwise interacted with the delivered content. Furthermore, the bids (if any) that are associated with the selected content are also tracked in the content provider accounts data store.

Processing logic periodically settles content provider accounts based on the tracked accounting data (processing block 904). The accounts may be settled after passage of a set amount of time (e.g., the first of every month), at regular accounting intervals (e.g., every two weeks), in response to meeting a specific dollar amount (e.g., every $5000), after depleting a deposit (e.g., after depleting a prepaid amount, requesting another prepaid amount), as well as at other intervals.

Figure 10:
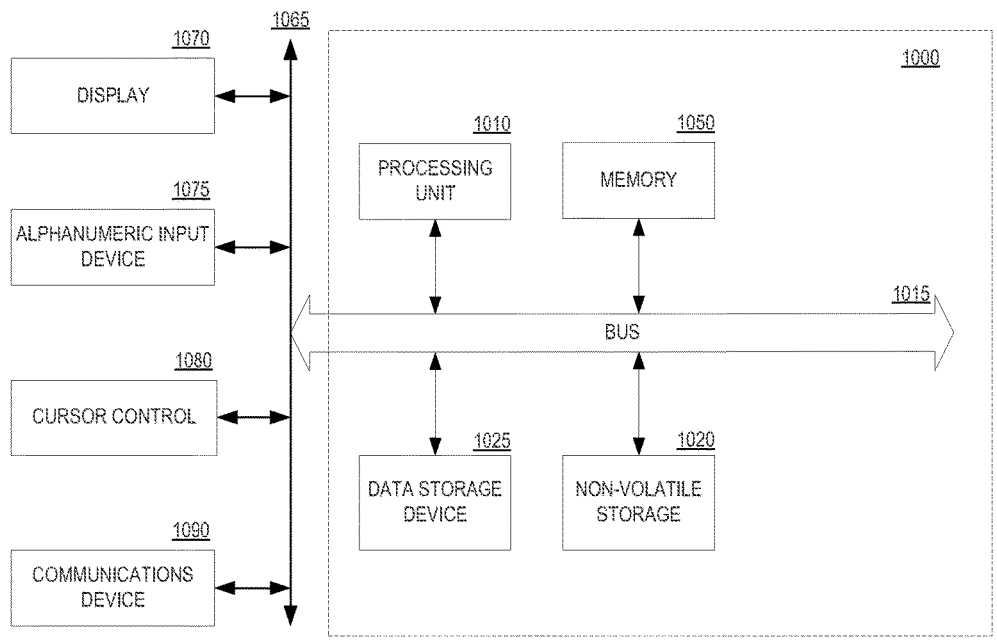
FIG. 10 is one embodiment of a computer system that may be used in accordance with an embodiment of the invention.

FIG. 10 is one embodiment of a computer processing system that may be used with the present invention. It will be apparent to those of ordinary skill in the art, however that other alternative systems of various system architectures may also be used. The computer processing system illustrated in FIG. 10 provides additional details for the server systems discussed above in FIGS. 1 and 2.

The computer processing system illustrated in FIG. 10 includes a bus or other internal communication means 1015 for communicating information, and a processor 1010 coupled to the bus 1015 for processing information. The system further comprises a random access memory (RAM) or other volatile storage device 1050 (referred to as memory), coupled to bus 1015 for storing information and instructions to be executed by processor 1010. Main memory 1050 also may be used for storing temporary variables or other intermediate information during execution of instructions by processor 1010. The system also comprises a read only memory (ROM) and/or static storage device 1020 coupled to bus 1015 for storing static information and instructions for processor 1010, and a data storage device 1025 such as a magnetic disk or optical disk and its corresponding disk drive. Data storage device 1025 is coupled to bus 1015 for storing information and instructions.

The system may further be coupled to a display device 1070, such as a liquid crystal display (LCD) coupled to bus 1015 through bus 1065 for displaying information to a computer user. An alphanumeric input device 1075, including alphanumeric and other keys, may also be coupled to bus 1015 through bus 1065 for communicating information and command selections to processor 1010. An additional user input device is cursor control device 1080, such as a touchpad, mouse, a trackball, stylus, or cursor direction keys coupled to bus 1015 through bus 1065 for communicating direction information and command selections to processor 1010, and for controlling cursor movement on display device 1070.

Another device, which may optionally be coupled to computer processing system 1000, is a communication device 1090 for accessing other nodes of a distributed system via a network. The communication device 1090 may include any of a number of commercially available networking peripheral devices such as those used for coupling to an Ethernet, token ring, Internet, local area network, wide area network, cellular communication network, or other networks. Note that any or all of the components of this system illustrated in FIG. 10 and associated hardware may be used in various embodiments of the present invention.

It will be appreciated by those of ordinary skill in the art that any configuration of the system may be used for various purposes according to the particular implementation. The control logic or software implementing the present invention can be stored in main memory 1050, mass storage device 1025, or other storage medium locally or remotely accessible to processor 1010.

It will be apparent to those of ordinary skill in the art that the system, method, and process described herein can be implemented as software stored in main memory 1050 or read only memory 1020 and executed by processor 1010. This control logic or software may also be resident on an article of manufacture comprising a computer readable medium having computer readable program code embodied therein and being readable by the mass storage device 1025 and for causing the processor 1010 to operate in accordance with the methods and teachings herein.

The present invention may also be embodied in a handheld or portable device containing a subset of the computer hardware components described above. For example, the handheld device may be configured to contain only the bus 1015, the processor 1010, and memory 1050 and/or 1025. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 1010, a data storage device 1025, a bus 1015, and memory 1050, and only rudimentary communications mechanisms, such as a small touch-screen that permits the user to communicate in a basic manner with the device. In general, the more special-purpose the device is, the fewer of the elements need be present for the device to function.

Figure 11:
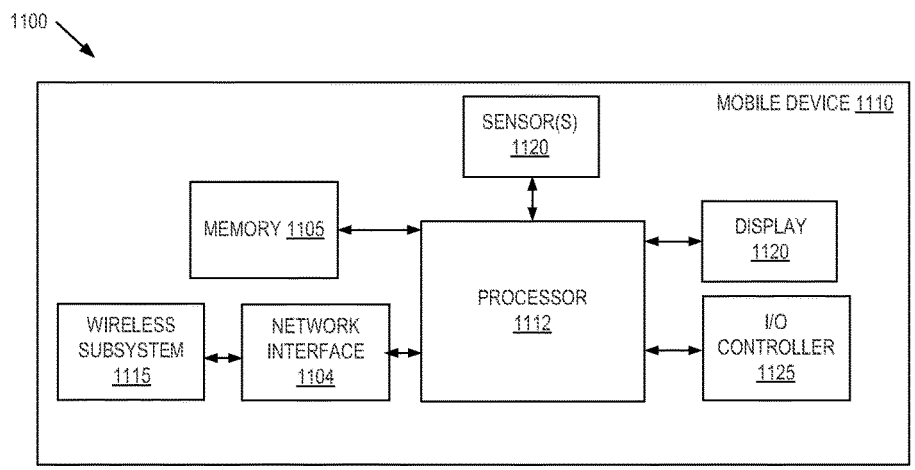
FIG. 11 is one embodiment of a mobile device that may be used in accordance with an embodiment of the invention.

FIG. 11 is block diagram of one embodiment 1100 of a mobile device. Mobile device 1110 provides additional details for mobile device discussed above in FIGS. 1 and 2.

In one embodiment, mobile device 1110 is a system, which may include one or more processors 1112, a memory 1105, I/O controller 1125, network interface 1104, one or more sensor(s) 1130 (e.g., positioning sensors, acceleration sensors, ambient condition sensors, etc.), and display 1120. Mobile device 1110 may also include a number of processing modules, which may be implemented as hardware, software, firmware, or a combination. It should be appreciated that mobile device 1110 may also include, although not illustrated, a user interface (e.g., keyboard, touch-screen, or similar devices), a power device (e.g., a battery), as well as other components typically associated with electronic devices. Network interface 1104 may also be coupled to a number of wireless subsystems 1115 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 1104 and wireless subsystem 1115 couple mobile device 1110 to a network.

Memory 1105 may be coupled to processor 1112 to store instructions for execution by processor 1112. In some embodiments, memory 1105 is non-transitory. It should be appreciated that embodiments of the invention as described herein may be implemented through the execution of instructions, for example as stored in the memory 1105 or other element, by processor 1112 of mobile device 1110 and/or other circuitry of mobile device 1110 and/or other devices. Particularly, circuitry of mobile device 1110, including but not limited to processor 1112, may operate under the control of a program, routine, or the execution of instructions to execute methods or processes in accordance with embodiments of the invention. For example, such a program may be implemented in firmware or software (e.g. stored in memory 1105 and/or other locations) and may be implemented by processors, such as processor 1112, and/or other circuitry of mobile device 1110. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 1110 itself and/or some or all of the functions, engines or modules described herein may be performed by another system connected through I/O controller 1125 or network interface 1104 (wirelessly or wired) to mobile device 1110. Thus, some and/or all of the functions may be performed by another system and the results or intermediate calculations may be transferred back to mobile device 1110. In some embodiments, such other device may comprise a server, such as anticipatory search server 130 configured to process information in real time or near real time. In some embodiments, the other device is configured to predetermine the results, for example based on an anticipated need of a user of the mobile device 1110.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method, comprising:
    collecting profile data indicative of behavior of a user with respect to usage of a mobile device;
    constructing a user profile, from the collected profile data, where the user profile comprises an anticipated usage of the mobile device by the user;
    publishing a content search request based on the anticipated usage of the mobile device by the user;
    providing the content search request to a communal location on a computing network accessible to a plurality of content provider systems;
    receiving a plurality of content responses from a plurality of content providers, each content response including content generated by a corresponding content provider purported to be relevant to the anticipated usage of the mobile device by the user, wherein each content provider is responsible for determining which content search requests to generate content responses to;
    determining a relevance of each of the plurality of received content responses based on a relevance of the content in said each of the plurality of received content responses based on the anticipated usage of the mobile device by the user;
    ranking the plurality of received content responses based on relative relevance associated with each received content response;
    selecting a subset of one or more content responses from the plurality of content responses based on the ranking of the plurality of received content responses; and
    providing the selected subset of content responses to the mobile device for populating an anticipatory home-screen browser with content from the selected subset.

2. The method of claim 1, wherein collecting the profile data comprises:
    receiving a first profile data from the mobile device; and
    obtaining a second profile data from a service provider system associated with the use of the mobile device.

3. The method of claim 2, wherein:

the first profile data comprises positioning data from a positioning system of the mobile device, application data indicative of one or more applications installed on the mobile device, current mobile device operating data indicative of which of the one or more applications are currently running, application usage data indicative of data processed by the one or more applications that are currently running, mobile device call log data, text messaging data from the mobile device, email messaging data from the mobile device, or any combination thereof; and the second profile data comprises content of email messages obtained from one or more email message service providers, text message content of text messages obtained from one or more messaging service providers, social networking content obtained from one or more social networking service providers, blog post content obtained from one or more blogging service providers, or any combination thereof.

4. The method of claim 1, further comprising:
saving the collected profile data to a behavior history indicative of a history of behaviors of the user with respect to usage of the mobile device; and
applying machine learning model analysis to the behavior history to predict the anticipated usage of the mobile device by the user.

5. The method of claim 4, further comprising:
developing a user-specific machine learning model from a general machine learning model for analysis of the collected profile data associated with the user, wherein the user specific machine learning model is developed for the user from an ongoing collection of new profile data saved to the behavior history.

6. The method of claim 1, wherein the content in the selected subset of content responses comprises information anticipated to be requested by the user, an instruction to launch an application anticipated to be launched by the user, a suggestion to download an application to the mobile device, a suggestion to access a service provided by a content provider, or any combination thereof.

7. The method of claim 1, wherein one or more of the plurality of received content responses are associated with a bid, the bid comprising a monetary value associated with selection and provision of the corresponding content response to the mobile device, further comprising:
adjusting the relevance of received content responses based on bids associated with the one or more of the plurality of received content responses;
generating the ranking based on the adjusted relevance of the received content response; and
selecting the subset of one or more content responses from the plurality of content responses based on the ranking.

8. The method of claim 1, further comprising:
prior to the collection of the profile data, establishing a user account for collecting user profile data and providing content to the mobile device for populating the anticipatory homescreen browser displayed by the mobile device, wherein the user account associates one or more privacy settings, collection settings, and zero or more third party service providers that are associated with the user account.

9. The method of claim 1, wherein the mobile device comprises a mobile telephone.

10. The method of claim 1, wherein the mobile device comprises a wearable device.

11. A non-transitory computer readable storage medium including instructions that, when executed by a processor, cause the processor to perform a method comprising:
collecting profile data indicative of behavior of a user with respect to usage of a mobile device;
constructing a user profile, from the collected profile data, where the user profile comprises an anticipated usage of the mobile device by the user;
publishing a content search request based on the anticipated usage of the mobile device by the user;
providing the content search request to a communal location on a computing network accessible to a plurality of content provider systems;
receiving a plurality of content responses from a plurality of content providers, each content response including content generated by a corresponding content provider purported to be relevant to the anticipated usage of the mobile device by the user, wherein each content provider is responsible for determining which content search requests to generate content responses to;
determining a relevance of each of the plurality of received content responses based on a relevance of the content in said each of the plurality of received content responses based on the anticipated usage of the mobile device by the user;
ranking the plurality of received content responses based on relative relevance associated with each received content response;
selecting a subset of one or more content responses from the plurality of content responses based on the ranking of the plurality of received content responses; and
providing the selected subset of content responses to the mobile device for populating an anticipatory homescreen browser with content from the selected subset.

12. The non-transitory computer readable storage medium of claim 11, wherein collecting the profile data comprises:
receiving a first profile data from the mobile device; and
obtaining a second profile data from a service provider system associated with the use of the mobile device.

13. The non-transitory computer readable storage medium of claim 12, wherein:
the first profile data comprises positioning data from a positioning system of the mobile device, application data indicative of one or more applications installed on the mobile device, current mobile device operating data indicative of which of the one or more applications are currently running, application usage data indicative of data processed by the one or more applications that are currently running, mobile device call log data, text messaging data from the mobile device, email messaging data from the mobile device, or any combination thereof; and the second profile data comprises content of email messages obtained from one or more email message service providers, text message content of text messages obtained from one or more messaging service providers, social networking content obtained from one or more social networking service providers, blog post content obtained from one or more blogging service providers, or any combination thereof.

14. The non-transitory computer readable storage medium of claim 11, further comprising
saving the collected profile data to a behavior history indicative of a history of behaviors of the user with respect to usage of the mobile device; and applying machine learning model analysis to the behavior history to predict the anticipated usage of the mobile device by the user.

15. The non-transitory computer readable storage medium of claim 14, further comprising:
developing a user-specific machine learning model from a general machine learning model for analysis of the collected profile data associated with the user, wherein the user specific machine learning model is developed for the user from an ongoing collection of new profile data saved to the behavior history.

16. The non-transitory computer readable storage medium of claim 11, wherein the content in the selected subset of content responses comprises information anticipated to be requested by the user, an instruction to launch an application anticipated to be launched by the user, a suggestion to download an application to the mobile device, a suggestion to access a service provided by a content provider, or any combination thereof.

17. The non-transitory computer readable storage medium of claim 11, wherein one or more of the plurality of received content responses are associated with a bid, the bid comprising a monetary value associated with selection and provision of the corresponding content response to the mobile device, further comprising:
adjusting the relevance of received content responses based on bids associated with the one or more of the plurality of received content responses;
generating the ranking based on the adjusted relevance of the received content response; and
selecting the subset of one or more content responses from the plurality of content responses based on the ranking.

18. The non-transitory computer readable storage medium of claim 11, further comprising:
prior to the collection of the profile data, establishing a user account for collecting user profile data and providing content to the mobile device for populating the anticipatory homescreen browser displayed by the mobile device, wherein the user account associates one or more privacy settings, collection settings, and zero or more third party service providers that are associated with the user account.

19. The non-transitory computer readable storage medium of claim 11, wherein the mobile device comprises a mobile telephone.

20. The non-transitory computer readable storage medium of claim 11, wherein the mobile device comprises a wearable device.

21. A server computing system comprising:
a memory; and
a processor coupled with the memory to
collect profile data indicative of behavior of a user with respect to usage of a mobile device,
construct a user profile, from the collected profile data, where the user profile comprises an anticipated usage of the mobile device by the user,
publish a content search request based on the anticipated usage of the mobile device by the user,
provide the content search request to a communal location on a computing network accessible to a plurality of content provider systems,
receive a plurality of content responses from a plurality of content providers, each content response including content generated by a corresponding content provider purported to be relevant to the anticipated usage of the mobile device by the user, wherein each content provider is responsible for determining which content search requests to generate content responses to,
determine a relevance of each of the plurality of received content responses based on a relevance of the content in said each of the plurality of received content responses based on the anticipated usage of the mobile device by the user,
rank the plurality of received content responses based on relative relevance associated with each received content response,
select a subset of one or more content responses from the plurality of content responses based on the ranking of the plurality of received content responses, and
provide the selected subset of content responses to the mobile device for populating an anticipatory homescreen browser with content from the selected subset.

22. The system of claim 21, comprising the processor to saving the collected profile data to a behavior history in the memory indicative of a history of behaviors of the user with respect to usage of the mobile device, and apply machine learning model analysis to the behavior history to predict the anticipated usage of the mobile device by the user.

23. The system of claim 22, comprising the processor to develop a user-specific machine learning model from a general machine learning model for analysis of the collected profile data associated with the user, wherein the user specific machine learning model is developed for the user from an ongoing collection of new profile data saved to the behavior history.

* * * * *